United States Patent [19]

Nagakura et al.

[11] 3,821,535

[45] June 28, 1974

[54] ELECTRONIC CALCULATOR HAVING AN INDICATOR BLANKING CIRCUIT

[75] Inventors: Katsuhiko Nagakura, Atami; Hidetoshi Kamoto, Atsugi, both of Japan

[73] Assignee: Sony Corporation, Tokyo, Japan

[22] Filed: Jan. 30, 1973

[21] Appl. No.: 328,031

[30] Foreign Application Priority Data

Jan. 31, 1972 Japan .............................. 47-01165

[52] U.S. Cl. ............................ 235/156, 340/324 M

[51] Int. Cl. ........................................... G06k 15/18

[58] Field of Search..... 235/156; 340/336 R, 334 R, 340/324 R, 324 M

[56] References Cited

UNITED STATES PATENTS

| | | | |
|---|---|---|---|
| 3,460,097 | 8/1969 | Kubo et al. | 235/156 X |
| 3,509,329 | 4/1970 | Wang et al. | 235/156 |
| 3,548,179 | 12/1970 | Kimura et al. | 235/156 |
| 3,603,965 | 9/1971 | Somlyody | 340/324 R |
| 3,648,102 | 3/1972 | Bettin | 340/324 R X |
| 3,679,933 | 7/1972 | Nakada et al. | 340/336 X |

*Primary Examiner*—Felix D. Gruber
*Assistant Examiner*—James F. Gottman
*Attorney, Agent, or Firm*—Alvin Sinderbrand, Esq.; Lewis H. Eslinger, Esq.

[57] ABSTRACT

An electronic calculator of a type having a buffer circuit which is used both for an arithmetic operation and for a decoding operation in an indicator section, is provided with an indicator deactivating or blanking circuit for blanking the indicator during the time period of the arithmetic operation, whereby flickering of the indicator and consequent eyestrain are avoided.

8 Claims, 9 Drawing Figures

ELECTRONIC CALCULATOR HAVING AN INDICATOR BLANKING CIRCUIT

BACKGROUND OF THE INVENTION

1. Field of the Invention

This invention relates generally to an indicator driving circuit of an electronic calculator and more particularly to an indicator deactivating or blanking circuit for blanking the indicator during the time period of an arithmetic operation.

2. Description of the Prior Art

Existing desk type electronic calculators and the like have a buffer circuit in the loop of an operation register, and such buffer circuit is usually common to both an arithmetic operation circuitry and a decoder circuitry of an indicator section. In such an electronic calculator, the indicator flickers during the arithmetic operation, because the buffer circuit is operative during the arithmetic operation and the indicator, which is supplied with signals from the buffer circuit, indicates the momentarily changing results of the arithmetic operation. The operator of the electronic calculator experiences eyestrain by reason of such flickering of the indicator, especially when he has to carry out a long sequence of arithmetic calculations.

The above mentioned defects can be easily avoided by providing different or individual buffer circuits for the arithmethic operation circuitry and for the decoder circuitry of the indicator section, but this undesirably increases the size and complexity of the electronic calculator. complexity of the electronic calculator.

SUMMARY OF THE INVENTION

The present invention provides an indicator deactivating or blanking circuit for an electronic calculator which has a buffer circuit used for both an arithmetic operation circuitry and a decoder circuitry of an indicator section. The indicator deactivating or blanking circuit is operated by a condition signal generated in a control section of the calculator to indicate that the calculator is performing an arithmetic operation, whereby the indicator is deactivated or blanked during the arithmetic operation even though the buffer circuit remains operative, and flickering of the indicator and consequent eyestrain are avoided.

Accordingly, it is an object of this invention to provide an improved indicator driving circuit for an electronic calculator.

It is another object of this invention to provide an improved indicator driving circuit for an electronic calculator by which flickering of the indicator of the electronic calculator is avoided or minimized.

DESCRIPTION OF THE PREFERRED EMBODIMENT

Figure 1:
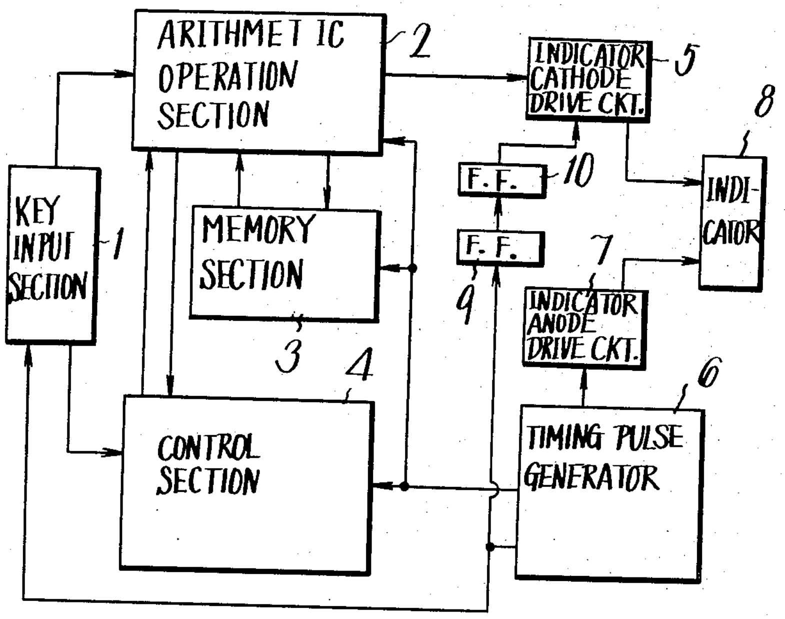
FIG. 1 is a functional block diagram showing the general arrangement of an electronic calculator of a type to which this invention may be applied.

First of all, an electronic calculator to which this invention may be applied will be generally described with reference to FIG. 1. As shown, such electronic calculator includes a key input section 1 from which signals are emitted in response to the selective actuation of a numeral key and an operation-key. An arithmetic operation section 2, which is hereinafter described in greater detail, is supplied with the numeral key signal from the key input section 1, and performs an arithmetic operation. A memory section 3 comprises a shift register and a memory register for the arithmetic operation and indication. A control section 4 is supplied with the signal emitted from key input section 1 in response to operation of an operation-key and includes a state control circuit. A cathode driving circuit 5 is connected to the cathodes of an indicator 8. The indicator 8 may include, for each place or numerical order to be depicted, for example, for the tens, hundreds, thousands etc., seven cathodes 20*a*-20*g* arranged in a figure "8" (FIG. 2) adjacent to an anode (not shown) which may be common to the seven cathodes. The cathodes are selectively activated, as hereinafter described in detail, so that an electrical discharge is produced between the anode and the selected cathodes for indicating a predetermined numeral or digit. Referring again to FIG. 1, it will be seen that the illustrated electronic calculator further includes the usual timing pulse signal generator 6 which generates clock pulses and includes an anode timing counter for successively driving the anodes of indicator 8, a bit timing counter, a digit timing counter and the like. An anode driving circuit 7 for the indicator 8 is supplied with the pulse signals from the anode timing counter of timing pulse generator 6 and successively drives the anodes of indicator 8 for a predetermined time period based upon the signals from the generator 6. The portion of the calculator shown on FIG. 1 is completed by flip-flop circuits 9 and 10 which are actuated by pulse signals from generator 6 to control the operation of indicator cathode drive circuit 5.

Figure 2:
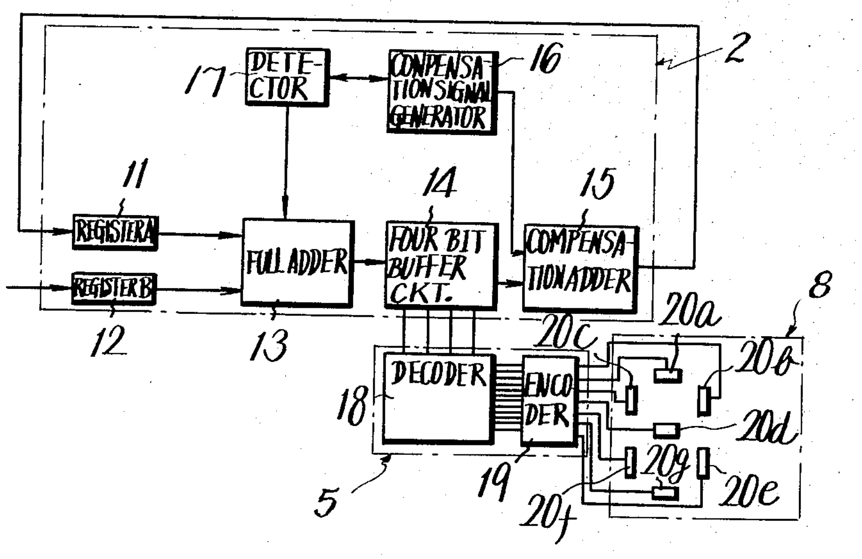
FIG. 2 is a block diagram showing compounds included in the arithmetic operation section, indicator cathode drive circuit, and indicator of the electronic calculator shown on FIG. 1.

As shown on FIG. 2, the arithmetic operation section 2 includes a register 11, a register 12, a full adder 13, a 4-bit buffer circuit 14, a compensation adder 15, a compensation signal generator 16 for generating a compensation signal such as, for example, a code signal "0110"=+6, and a detector 17. As is well known, the buffer circuit 14 is employed for carrying out the compensation arithmetic operation. Further, as shown on FIG. 2, the indicator cathode drive circuit 5 includes a decoder 18, and an encoder 19 connected with the light emitting elements or cathodes 20*a*-20*g* of indicator 8. With the arrangement shown in FIG. 2, signals from registers 11 and 12 are added in the full adder 13 and then fed through buffer circuit 14 to compensation adder 15 to be compensated in the latter, and at the same time are indicated on indicator 8 through buffer circuit 14, all in a conventional manner.

Figure 3:
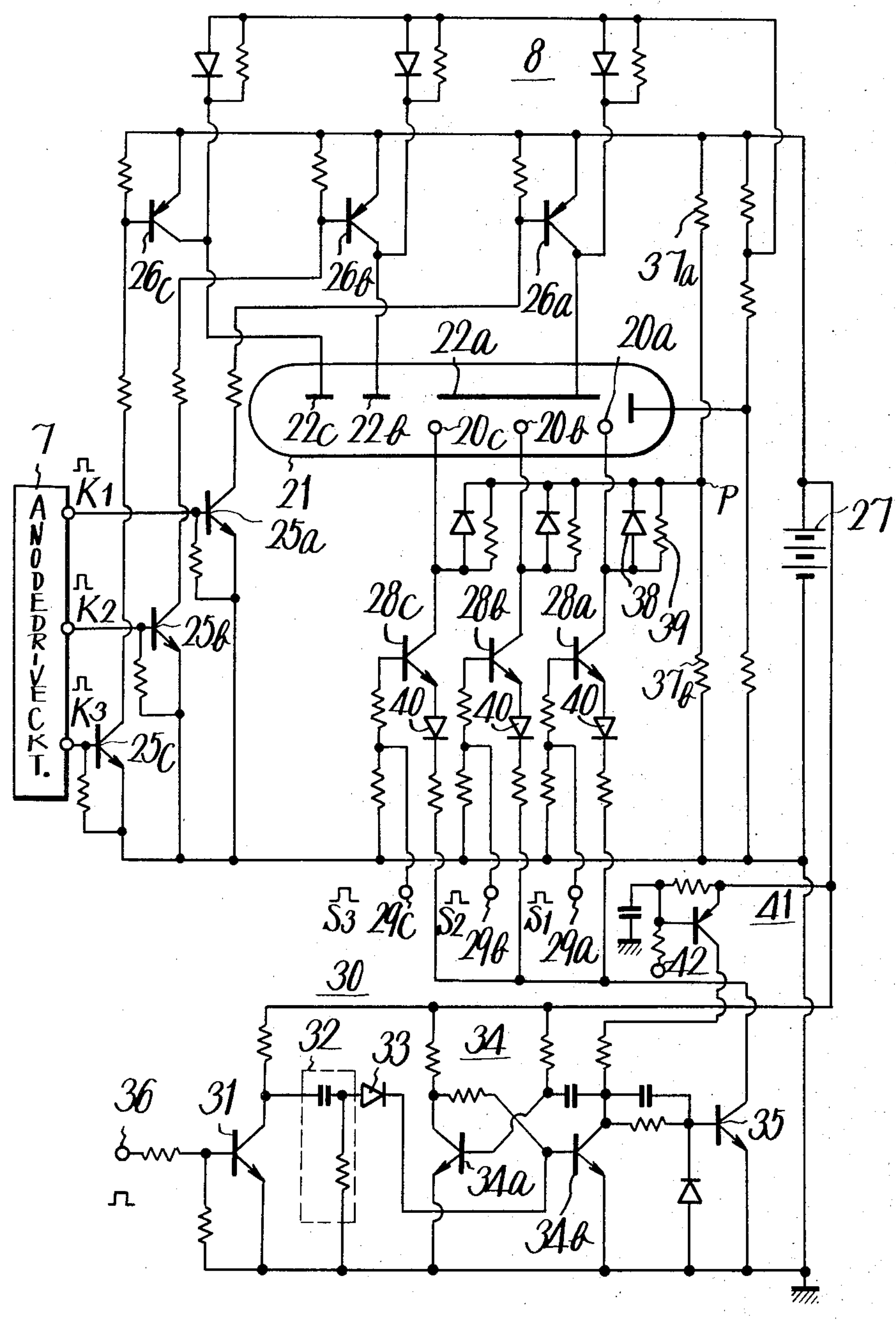
FIG. 3 is a wiring diagram of the indicator used in the electronic calculator of FIG. 1, and of the indicator deactivating or blanking circuit in accordance with an embodiment of this invention.

Referring now to FIG. 3, in which the indicator 8 is shown in detail for operation by signals from cathode driving circuit 5 and anode driving circuit 7, it will be seen that the indicator 8 includes a sealed envelope 21, for example, of glass, containing a plurality of anodes 22*a*, 22*b*, 22*c*—etc., each of which corresponds to a respective place or numerical order, for example, the tens, hundreds, thousands—etc., which is to be indicated or displayed by indicator 8. The envelope 21 further contains a series of cathodes associated with each of the anodes 22*a*, 22*b* and 22*c*, for example, the cathodes 20*a*, 20*b* and 20*c* associated with anode 22*a*. Although only three cathodes are shown associated with anode 22*a*, it is to be understood that a large number of cathodes are preferably provided, for example, seven cathodes arranged in a figure "8" as on FIG. 2, and further that a similar number of cathodes are associated with each of the anodes which, in turn, can be more numerous than shown on FIG. 3.

Figures 4A, 4B, 4C:
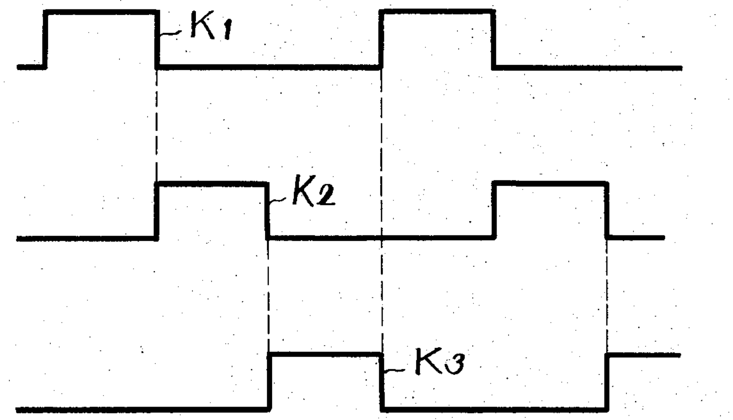
FIGS. 4A to 4C and 5A to 5C, inclusive, are waveform diagrams to which reference will be made in explaining the operation of the indicator deactivating or blanking circuit according to this invention.

The anode driving circuit 7 produces signals $K_1$, $K_2$, $K_3$ (FIGS. 4A to 4C) to sequentially drive the anodes 22*a*, 22*b*, 22*c*, respectively. The signals $K_1$, $K_2$ and $K_3$ are respectively applied to the base electrodes of transistors 25*a*, 25*b* and 25*c* which constitute first switching elements. When the transistors 25*a*-25*c* are made conductive, respective transistors 26*a*, 26*b* and 26*c* which constitute second switching elements, are made conductive between their emitter-base electrodes, that is, the transistors 26*a*-16*c* are made conductive, with the result that DC voltage is applied to the respective anodes 22*a*-22*c* from a DC electric power source 27. The cathodes 20*a*-20*c* associated with each of the anodes are connected to ground through the collector-emitter electrodes of respective transistors 28*a*, 28*b* and 28*c* which constitute third switching elements, when indication signals $S_1$, $S_2$, $S_3$ are selectively applied to the base electrodes of transistors 28*a*, 28*b*, 28*c* from respective signal input terminals 29*a*, 20*b*, 20*c* which receive such signals from cathode driving circuit 5 and more particularly from the encoder 19 of the latter (FIG. 2).

In accordance with the present invention, a circuit 30 (FIG. 3) is provided for deactivating or blanking the indicator 8 for a predetermined time period during which the indication by indicator 8 is being shifted or changed. In the embodiment of the invention illustrated on FIG. 3, the indicator blanking or deactivating circuit 30 is shown to comprise a transistor 31, a differentiation circuit 32 connected thereto, a monostable multivibrator 34 including a pair of transistors 34*a* and 34*b* to which the diffentiated pulse from the differentiation circuit 32 is applied, as a trigger pulse, through a diode 33, and a transistor 35 which is supplied with the output from the multi-vibrator 34. The emitter electrodes of transistors 28*a* to 28*c* are connected to respective diodes 40 which are connected together to ground through the collector-emitter electrodes of transistor 35. The diodes 40 ensure that, when one of the transistors 28*a*-28*c*, for example, transistor 28*a*, is made conductive, reverse current flows through the emitter-base electrodes of the other transistors 28*b* and 28*c* are prevented to avoid damage to such other transistors.

Figures 5A, 5B, 5C:
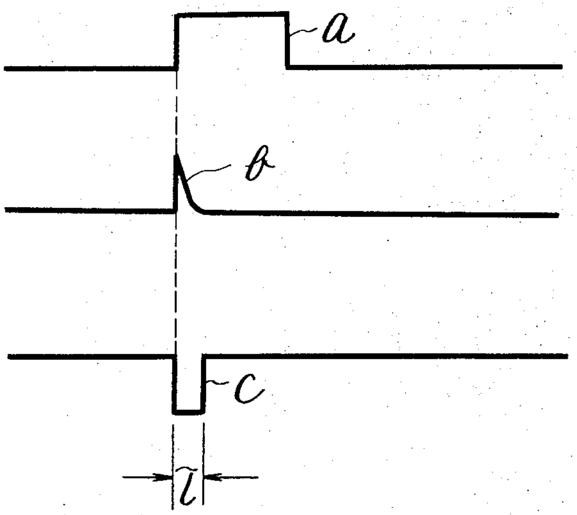

The base electrode of transistor 31 in indicator blanking circuit 30 is supplied through an input terminal 36 with a pulse signal *a* (FIG. 5A) which is synchronized with the signals $K_1$-$K_3$ sequentially derived from indicator anode drive circuit 7, so that differentiation circuit 32 provides differentiated pulses in correspondence with the leading and trailing edges, respectively of the pulse signal *a*. However, only the pulse signal *b* of positive polarity (FIG. 5B) is applied to multivibrator 34 due to the provision of diode 33, with the result that a pulse signal *c* (FIG. 5*c*) of negative polarity is derived from multivibrator 34 and applied to the base electrode of transistor 35 for rendering the latter non-conductive for the duration or period $\tau$ of the pulse signal *c*. The base electrode of transistor 35 is normally supplied with DC voltage from DC power source 27 so that transistor 35 is thereby normally made conductive to connect the emitter electrodes of transistors 28*a*-28*c* to ground except for the duration $\tau$ of pulse signal *c*. Thus, when signals $S_1$, $S_2$, $S_3$ are sequentially applied to the base electrodes of respective transistors 28*a*, 28*b* 28*c* the latter are rendered conductive to connect the respective cathodes 20*a*, 20*b*, 20*c* to ground and thereby repeatedly produce the respective indication or indications by discharges from the respective anode 22*a*, driven in response to the signal $K_1$, to the cathode or cathodes thereby connected to ground. Of course, similar operations would occur in respect to the cathodes (not shown) associated with the other anodes 22*b* and 22*c* when the latter are driven in response to the signals $K_2$ and $K_3$, respectively.

However, for the duration $\tau$ of each pulse signal *c*, that is, the initial portion of each of the anode driving signals $K_1$-$K_3$, the emitter electrodes of transistors 28*a*-28*c* are not grounded, as transistor 35 is rendered non-conductive by signal *c* and, therefore, no discharges occur between the driven anode and any of its associated cathodes and no indications appear during the time period $\tau$. Thus, ions produced by discharges prior to each time period $\tau$ are substantially dissipated during the latter. As a result of the foregoing, false indications are avoided when the indication provided by indicator 8 is being shifted or changed. For example, when anode 22*b* is driven in response to anode driving signal $K_2$ to provide a certain indication with its associated cathodes (not shown), the indication afforded by the previously driven anode 22*a* and its associated cathodes 20*a*-20*c* during the anode driving signal $K_1$ will not reappear during the signal $K_2$ by reason of the dissipation of ions in the time period $\tau$ at the beginning of signal $K_2$.

In order to ensure that the indication by indicator 8 is stopped or interrupted during each time period $\tau$ when signal *c* is applied to transistor 35 to render the latter non-conductive, a D.C. voltage is applied to each of cathodes 20*a*-20*c* during each time period $\tau$ through a respective parallel circuit of a diode 38 and a resistor 39 from a connection point P between voltage divider resistors 37*a* and 37*b* which are connected across DC power source 27. Such DC voltage applied to cathodes 20*a*-20*c* during each time period $\tau$ decreases the voltage difference between the cathodes and the respective anode 22*a*, and thereby ensures that there will be no discharge therebetween in the time period $\tau$. In a practical example of the illustrated embodiment, the duration of each of the anode driving signals $K_1$-$K_3$ is 320 micro-seconds and the time period $\tau$ is 50 micro-seconds, form which it follows that the indication or display time period is 270 micro-seconds. It will be understood that, instead of applying a DC voltage to the cathodes of indicator 8 for ensuring the interruption of discharging during the time period $\tau$, the same result can be achieved by suitably applying a voltage or signal to the anodes 22*a*-22*c* during each time period $\tau$ for reducing the voltage difference between the anodes and cathodes.

Further, in accordance with this invention, a device 41 is provided for rendering the transistor 35 non-conductive, and thereby stopping the indication by indicator 8, during the arithmetic operation of the calculator. In the illustrated embodiment, the device 41 is shown to comprise a transistor, for example, a PNP-type transistor, as shown, which has its collector-emitter electrodes connected between DC power source 27 and the collector electrode of transistor 34*b* in the multivibrator 34 of circuit 30. The base electrode of transistor 41 is connected to a terminal 42 which receives a suitable signal, for example, from the control section 4 (FIG. 1) of the computer only during arithmetic operation of the latter.

It will be apparent that the transistor 41 is interposed in the circuit by which a DC voltage is normally applied to the base electrode of transistor 35 from source 27 for normally making transistor 35 conductive. Thus, even when circuit 30 does not apply the signal *c* of negative polarity to the base electrode of transistor 35, the latter is rendered conductive only when transistor 41 is conductive. The signal applied to terminal 42 from control section 4 may have the value of 5 volts when the electronic calculator or computer is performing an arithmetic operation, and a value of 0 volts when the electronic calculator is not performing an arithmetic operation.

When the electronic calculator is not performing an arithmetic operation, that is, when the potential at terminal 42 is 0 volts, transistor 41 is rendered conductive so that transistor 35 is also made conductive except during the time periods $\tau$ when the pulse signal *c* of negative polarity is applied to the base electrode of transistor 35 by circuit 30. On the other hand, when the electronic calculator is performing an arithmetic operation, that is, when the potential applied to terminal 42 is 5 volts, the transistor 41 is rendered non-conductive so that no base current passes the transistor 35 and the latter is also rendered non-conductive. By reason of the foregoing, the transistors 28*a*-28*c* no longer have their collector-emitter electrodes connected to ground and, as a result, no indication appears on the indicator 8 during the arithmetic operation.

It will be seen from the foregoing that, even though the buffer circuit 14 is used for both the indication operation and the arithmetic operation, flickering of the indicator 8 during the arithmetic operation is avoided.

Although the invention has been described above in relation to a particular indicator 8, it is apparent that the invention may be similarly applied to other indicators, such as, for example, Nixie tubes, light-emitting diodes and the like.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention.

What is claimed is:

1. An electronic calculator comprising:

arithmetic operation means having a signal loop including at least a first register, an adder and a buffer circuit, and a second register connected to said adder so that the latter may add signals from said first and second registers, indicating means including an indicator and an indicator driving circuit having a decoder circuit which is connected to said buffer circuit to operate said indicator driving circuit in response to signals supplied to said decoder circuit from said adder by way of said buffer circuit, control means for producing a condition signal at least during a substantial portion of the period of an operation by said arithmetic operation means, and circuit means operative in response to said condition signal to deactivate said indicator driving circuit for at least said portion of the operation period of said arithmetic operation means.

2. An electronic calculator according to claim 1, wherein said indicator has at least first and second electrodes, and said indicator driving circuit is connected to one of said first and second electrodes.

3. An electronic calculator according to claim 2, wherein said first and second electrodes are an anode and a cathode, respectively.

4. An electronic calculator comprising:

arithmetic operation means having a signal loop including at least a first register, an adder and a buffer circuit, and a second register connected to said adder so that the latter may add signals from said first and second registers;

an indicator including a plurality of anodes and a plurality of cathodes associated with each of said anodes;

anode drive circuit means emitting anode drive signals for driving said anodes sequentially;

cathode drive circuit means including decoder circuit means connected with said buffer circuit for emitting cathode drive signals to activate said indicator and produce a corresponding indication by means of a discharge between the driven anode and cathode in response to signals supplied to said decoder circuit means from said adder by way of said buffer circuit;

first circuit means deactivating said indicator at the termination of each of said anode drive signals for dissipating ions resulting from said discharge between the previously driven anode and cathode;

control means for producing a condition signal at least during a substantial portion of the period of an operation by said arithmetic operation means; and second circuit means operative in response to said condition signal for deactivating said indicator and thereby avoiding a flickering indication by said indicator at least during said portion of the operation period of said arithmetic operation means.

5. An electronic calculator according to claim 4; further comprising means for substantially reducing the potential difference between the associated anodes and cathodes during the deactivation of said indicator.

6. An electronic calculator according to claim 4; wherein said said indicator includes switching means interposed between each of cathodes and ground and being adapted to be turned on by the respective cathode drive signals, and said first circuit means includes a transistor interposed between said switching means and ground and being normally conductive, and pulse signal generating means for producing a pulse signal rendering said transistor non-conductive for a relatively short period at the commencement of each of said anode driving signals.

7. An electronic calculator according to claim 6; in which said second circuit means includes means responsive to said condition signal for rendering said transistor non-conductive during said portion of the operation period of said arithmetic operation means.

8. An electronic calculator according to claim 7; further comprising means for substantially reducing the potential difference between the associated anodes and cathodes upon said transistor being rendered non-conductive.

* * * * *